US008661268B2

(12) United States Patent
Brooks et al.

(10) Patent No.: US 8,661,268 B2
(45) Date of Patent: Feb. 25, 2014

(54) METHODS AND APPARATUS FOR INTELLIGENTLY PROVIDING POWER TO A DEVICE

(75) Inventors: Benjamin Brooks, San Jose, CA (US); Eric Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 572 days.

(21) Appl. No.: 12/840,194

(22) Filed: Jul. 20, 2010

(65) Prior Publication Data
US 2011/0208980 A1 Aug. 25, 2011

Related U.S. Application Data (60) Provisional application No. 61/306,836, filed on Feb. 22, 2010.

(51) Int. Cl.
*G06F 1/00* (2006.01)

(52) U.S. Cl.
USPC .......................................... 713/300; 713/340

(58) Field of Classification Search
USPC .......... 713/300, 310, 324, 340; 710/300, 105, 710/106, 110, 305, 313
See application file for complete search history.

(56) References Cited

U.S. PATENT DOCUMENTS

| 5,884,086 | A * | 3/1999 | Amoni et al. ................. 713/300 |
| 6,516,205 | B1 * | 2/2003 | Oguma .......................... 455/557 |
| 7,024,567 | B2 * | 4/2006 | Kim et al. ..................... 713/300 |
| 7,159,132 | B2 * | 1/2007 | Takahashi et al. ............ 713/310 |
| 7,454,630 | B1 * | 11/2008 | Ong et al. ...................... 713/300 |
| 7,769,914 | B2 * | 8/2010 | Kim et al. ......................... 710/11 |
| 2001/0003205 | A1 * | 6/2001 | Gilbert .......................... 713/320 |
| 2005/0120250 | A1 * | 6/2005 | Adachi .......................... 713/300 |
| 2005/0151511 | A1 | 7/2005 | Chary |
| 2005/0158065 | A1 * | 7/2005 | Matsuda ......................... 399/66 |
| 2005/0278554 | A1 * | 12/2005 | Frank ............................ 713/300 |
| 2007/0013523 | A1 | 1/2007 | Paradiso et al. |
| 2007/0079157 | A1 * | 4/2007 | Wang et al. .................... 713/300 |
| 2008/0178011 | A1 * | 7/2008 | Hubo et al. .................... 713/300 |
| 2008/0229121 | A1 * | 9/2008 | Lassa et al. ................... 713/300 |
| 2008/0307240 | A1 | 12/2008 | Dahan et al. |
| 2009/0100275 | A1 * | 4/2009 | Chang et al. ................. 713/300 |
| 2009/0179611 | A1 | 7/2009 | Sander et al. |
| 2011/0116807 | A1 * | 5/2011 | Park et al. ...................... 398/164 |
| 2011/0123144 | A1 * | 5/2011 | Wang et al. ..................... 385/14 |
| 2011/0191480 | A1 * | 8/2011 | Kobayashi .................... 709/227 |
| 2011/0320837 | A1 * | 12/2011 | Suematsu ..................... 713/320 |

OTHER PUBLICATIONS

USB Emerging Device Classes, Intel Corporation, undated.*

* cited by examiner

*Primary Examiner* — Khanh Dang
(74) *Attorney, Agent, or Firm* — Womble Carlyle Sandridge & Rice LLP (57) ABSTRACT

Methods and apparatus for intelligently powering an electronic device are provided. In one embodiment of the invention, a systems management controller controls a power interface to intelligently negotiate power distribution with a peer, client, or a host device. The primary data path is unaffected by the system management controller communications. Various aspects of the present invention are demonstrated with respect to an exemplary implementation of a unified interface, consisting of an optical link (data path) and a USB link (power). As described, one exemplary embodiment of the invention provides a device with power at levels which are much increased over prior art USB solutions.

39 Claims, 9 Drawing Sheets

FIG. 9

METHODS AND APPARATUS FOR INTELLIGENTLY PROVIDING POWER TO A DEVICE

PRIORITY

This application claims priority to U.S. Provisional Patent Application Ser. No. 61/306,836 filed Feb. 22, 2010 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of power management for electronic devices. More particularly, in one exemplary aspect, the present invention is directed to methods and apparatus for intelligently providing power to a peer or slave device via a unified power and data interface.

2. Description of Related Technology

Many existing computer system or electronic interfaces integrate or unify various types of functions, including data and electrical power delivery. For example, an interface can provide a port for signaling and power delivery between computerized devices and associated external peripherals.

Existing solutions for USB 2.0 and USB 3.0 provide power delivery to and from USB devices and hosts (details regarding the Universal Serial Bus (USB) are described at, inter alia; the USB Specification Revision 2.0 published Apr. 27, 2000 entitled "*Universal Serial Bus Specification*"; and the USB 3.0 Specification Revision 0.85 published Apr. 4, 2008 entitled "*Universal Serial Bus 3.0 Specification*"; the contents of each which are incorporated herein by reference in their entirety). For example, the aforementioned USB 2.0 specification defines a maximum power delivery of 2.5 W (USB 2.0 maximally supports five (5) 100 mA loads at 5V). Similarly, the aforementioned USB 3.0 specification defines a maximum power delivery of 4.5 W (USB 3.0 maximally supports six (6) 150 mA loads at 5V).

Unfortunately, existing USB power delivery mechanisms are insufficient for powering several types of devices such as, inter alia, a mobile computer or laptop, via standardized USB mechanisms. Many mobile computers can consume power in the range of 40 W to 85 W depending on configuration, operational mode, etc.; these power draw levels are more than ten (10) times greater than current USB power supply capabilities.

Thus, improved solutions are required for delivering non-standard power (e.g., greatly increasing power delivery capabilities) to certain devices via existing port interfaces. Such improved solutions should ideally remain fully compatible with existing and legacy functions of the constituent interfaces (e.g., standard USB power delivery).

More generally however, improved methods and apparatus are needed for intelligently providing multiple power delivery capabilities to populations of devices having different requirements, via e.g., a standardized interface.

SUMMARY OF THE INVENTION

The present invention satisfies the aforementioned needs by providing improved methods and apparatus for electronic device power delivery and management. In a first aspect of the invention, a method of powering a peripheral or slave device is disclosed. In one embodiment, the method includes using an interface between the peripheral and another device (e.g., host) to assume an enhanced power delivery mode. In one variant, the structural interface (e.g., a connector) is a unified configuration with one or more signal (e.g., optical and/or electrical) interfaces, and a power interface, and the method includes use of the power interface to provide enhanced power modes and capabilities. In another variant, the interface is a unified interface with both optical and USB interfaces, and the method includes re-tasking the USB interface from its normal functionality to act as an enhanced power delivery conduit, while the optical interface is tasked with handling all data communications.

In a second aspect of the invention, a system power controller is disclosed. In one embodiment, the controller is an integrated circuit adapted to communicate with an entity of another device in order to negotiate and intelligently control power delivery.

In a third aspect of the invention, a system comprising a powered device and powering device is disclosed. In one embodiment, the powered device is a peripheral, and the powering device is a charging host (e.g., computer).

In a fourth aspect of the invention, an intelligent peripheral or "slave" device is disclosed. In one embodiment, the peripheral has sufficient intelligence (e.g., via a controller or other such logic) to negotiate with a host via a data interface so as to obtain "enhanced" power for operation of the peripheral.

In a fifth aspect of the invention, a method of powering a plurality of linked or chained peripherals using a single power source is disclosed.

In a sixth aspect of the invention, a data interface capable of enhanced power supply is disclosed. In one embodiment, the interface is a unified interface having associated intelligence so as to enable negotiation and delivery of an enhanced power signal (e.g., greater level of power, sufficient to completely power one device from another).

In a seventh aspect of the invention, a computerized apparatus adapted for enhanced power delivery and/or receipt is disclosed. In one embodiment, the apparatus includes: a dual interface, having: one or more interfaces for data transfer; and a power interface having a power output capable of driving multiple power levels; and a processor coupled to the power interface; and a storage device in data communication with the processor. The storage device includes computer-executable instructions that, when executed by the processor and responsive to a device coupling to the dual interface: determine a power level for the device; and enable the power output at the power level.

In another embodiment, the apparatus includes: a dual interface, having a first interface for data transfer; and a second interface for data transfer, the second interface also having a power output capable of driving multiple power levels; a processor coupled to the second interface; and a storage device in data communication with the processor. The storage device includes computer-executable instructions that, when executed by the processor and responsive to a device coupling to the dual interface: determine a power level for the device; and enable the power output at the power level.

Other features and advantages of the present invention will immediately be recognized by persons of ordinary skill in the art with reference to the attached drawings and detailed description of exemplary embodiments as given below.

DETAILED DESCRIPTION OF THE INVENTION

Reference is now made to the drawings, wherein like numerals refer to like parts throughout.

Overview

In one aspect, the present invention provides methods and apparatus for intelligently providing power to a device. In one exemplary embodiment, a unified interface is configured to safely provide power levels which are an order of magnitude greater than previously possible (e.g., 28V (85 W)). A system management controller (SMC) communicates with other similar devices to negotiate "enhanced" power delivery; i.e., unlike prior art power delivery via standardized interfaces, the negotiated power delivery of the invention enables the provision of non-standard power over standardized connectors. The intelligence of the SMC determines if the connected device is also intelligent/compatible, to prevent unwanted operation with non-enabled devices.

In one implementation of the present invention, a device can request a non-standard power level from a powered host, or alternatively, an unpowered peripheral can request non-standard power levels from a host, thereby enabling a "single cable" solution for receiving power and data via the same interface. The exemplary embodiment utilizes a power transceiver for negotiating power management, thus a primary interface (e.g., data interface, such as an optical transceiver) is completely unaffected by power management traffic. Negotiation of delivered power is maintained separately from software application traffic (e.g., peripheral access, network access, etc.), and can be implemented within very low level logic, or processing.

Additionally, an invention-enabled device can revert to legacy or extant methods for powered operation (e.g., power at a lower level over the USB interface, or a wall adapter, etc.). Devices which do not detect similarly enabled devices continue to operate per existing standards or technologies. In one implementation, the interface is purposely made compatible with existing standards so as to ensure that the invention-enabled device interacts seamlessly with the wide array of non-enabled equipment.

Detailed Description of Exemplary Embodiments

Exemplary embodiments of the present invention are now described in detail. While these embodiments are primarily discussed in the context of a unified interface, it will be recognized by those of ordinary skill that the present invention is not so limited. In fact, the various aspects of the invention are useful in any system interface or connection that can benefit from powering multiple device types (or supplying multiple types of power to the same or different devices), as described herein.

Exemplary Unified Port Interface—

A unified port may combine multiple transceiver types in order to support a wide range of I/O protocols over a standard interface. Incipient implementations of unified interfaces should replace a wide array of connector types including: USB, FireWire, Ethernet, eSATA, VGA, DVI, DisplayPort, etc. with a single connector type. Unified ports may include support for: (i) so called "plug and play" configuration, (ii) high speed data transfers. Furthermore, such unified interfaces should support a wide variety of network topologies including, for example: daisy-chains, hierarchical trees, peer-to-peer connections, general graph topologies, etc.

Figure 1:
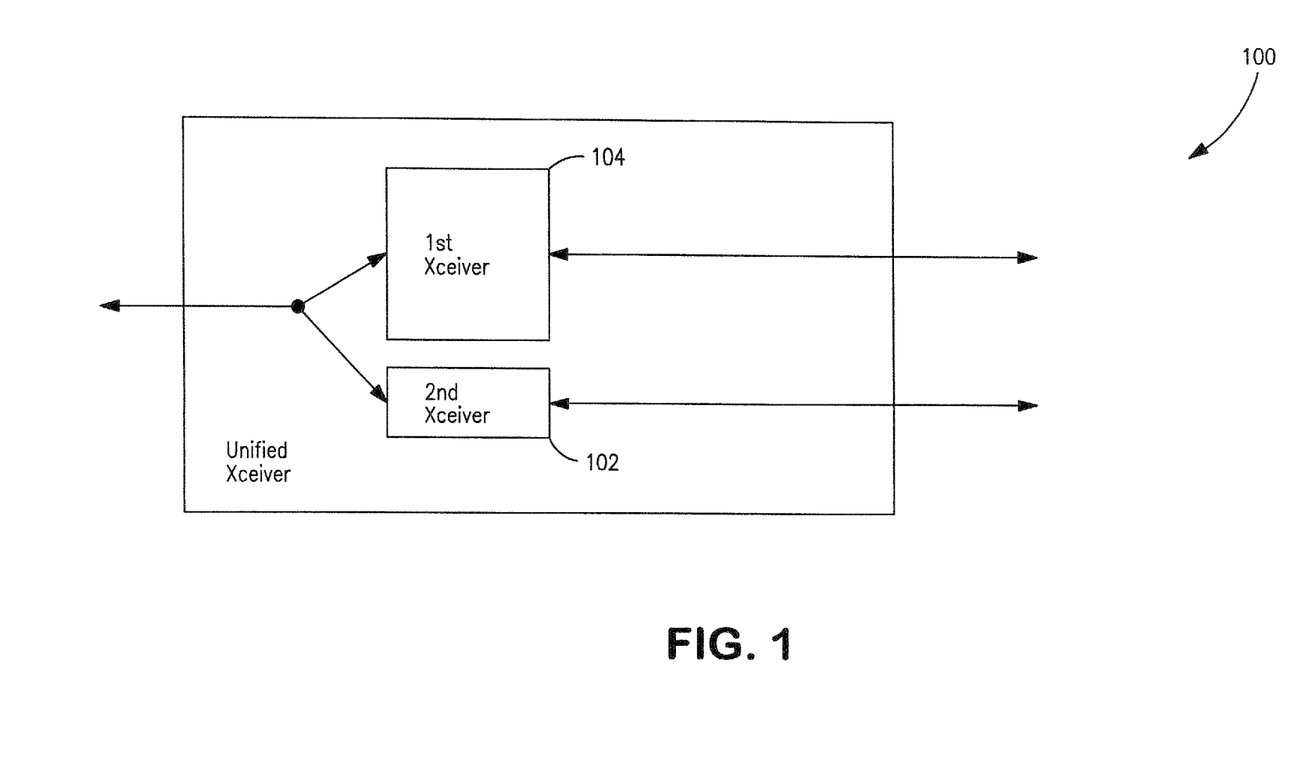
FIG. 1 is a graphical representation of a generalized unified interface comprising one or more transceiver(s).

FIG. 1 is a graphical representation of a generalized unified interface 100. The unified interface comprises both a first interface 102, and a second interface 104. It is appreciated that the unified interface may comprise any number of interfaces, two (2) being purely illustrative. Alternate embodiments may implement multiple protocols over a single interface, or conversely multiple interfaces (N) to multiple protocols (M). Mapping (N to M) of multiple interfaces to multiple protocols is readily implemented by those having ordinary skill in the related arts, given the contents of the present disclosure. Furthermore, it is appreciated that unified interface implementations may simultaneously or switchably support multiple independent interfaces.

Figure 2:
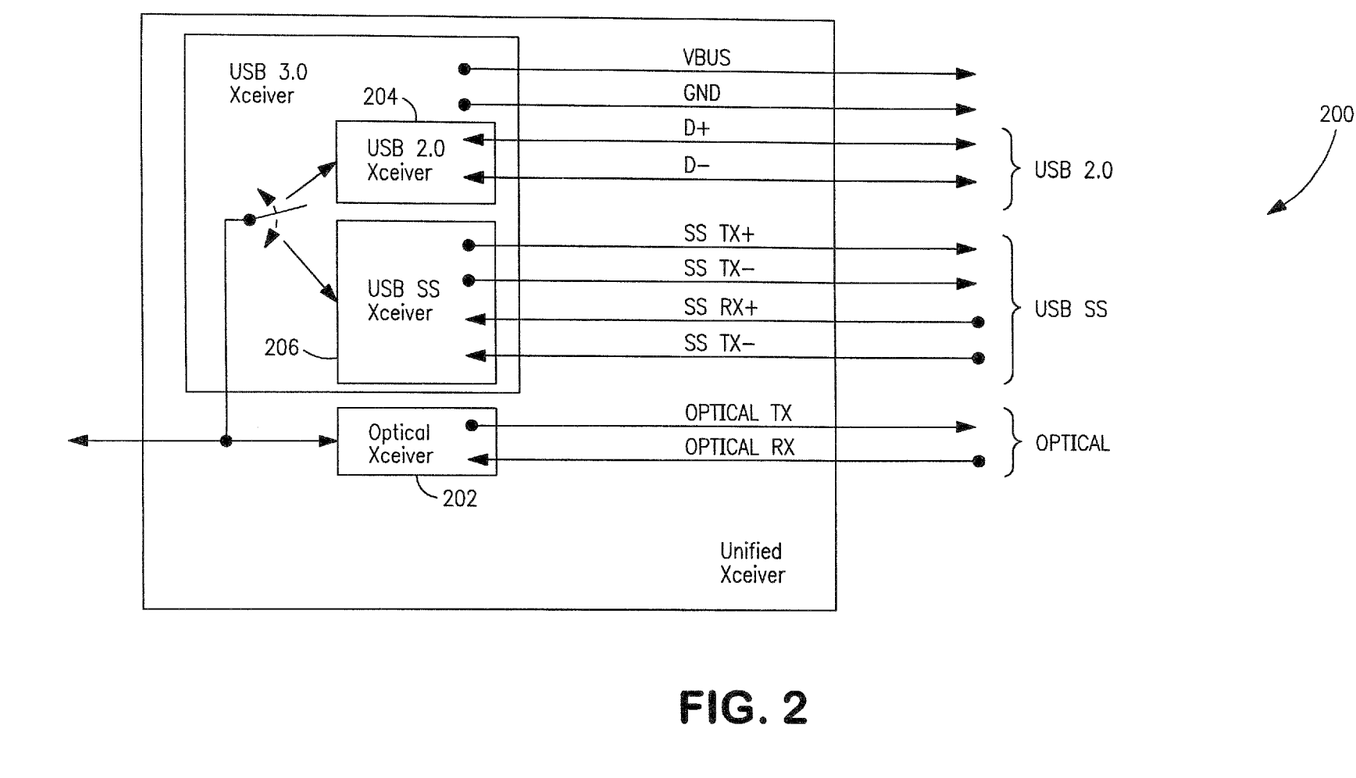
FIG. 2 is a graphical representation of one exemplary unified interface transceiver comprising an optical transceiver, and a USB 3.0 transceiver.

FIG. 2 is one exemplary unified interface 200 implemented with an electrical interface (here, USB 3.0), and an optical interface 202. As shown, each interface comprises a dual-simplex communication channel (i.e., a unidirectional connection in each direction) to a mated unified port. Each link may be separated into multiple "lanes". For the exemplary optical interface, a lane is characterized as one or more wavelengths of light multiplexed into the optic fiber. For the exemplary electrical interface, a lane is characterized as the coupled differential connections (i.e., a receive differential pair (RX), and a transmit differential pair (TX)).

As shown, the electrical interface of this embodiment is a USB 3.0 transceiver, which further comprises both a USB 2.0 transceiver 204 and a USB Super Speed (SS) transceiver 206. During USB 3.0 operation, only one of the USB transceivers is active (i.e., only USB 2.0 or USB SS). The USB SS bus consists of two (2) uni-directional differential links (transmit (TX) and receive (RX)). The USB 2.0 bus is a differential bus (D+, D−) which supports uni-directional data transfers in both directions, and bi-directional control. The D+/D− signal pins USB 2.0 are not used in USB SS operation; however power and ground (VBUS and GND) are shared.

Typically, USB power delivery is specified at a nominal 5V voltage. The aforementioned USB specifications (previously incorporated by reference in their entirety) support a power voltage range from 5.25V to 4.75V (i.e., 5V±5%) Furthermore, within the acceptable voltage ranges, the USB specifications also specify a "unit" load. Low power devices typically consume a single unit load. High power devices can consume the maximum number of unit loads. Within the USB 2.0 specification, a unit load is 100 mA, and each device may support up to five (5) unit loads. USB 3.0 devices have increased unit loads to 150 mA, and can sustain a maximum of six (6) unit loads. By default, all devices initialize in a low-power (i.e., only consuming one (1) unit load) state; subsequently thereafter, the device must request high power operation to receive additional power.

The unified interface 200 of FIG. 2 implements a USB 2.0 compliant interface 204, a USB SS compliant interface 206, and an optical interface 202. These interfaces can operate simultaneously and independently.

Exemplary System Architecture—

Figure 3:
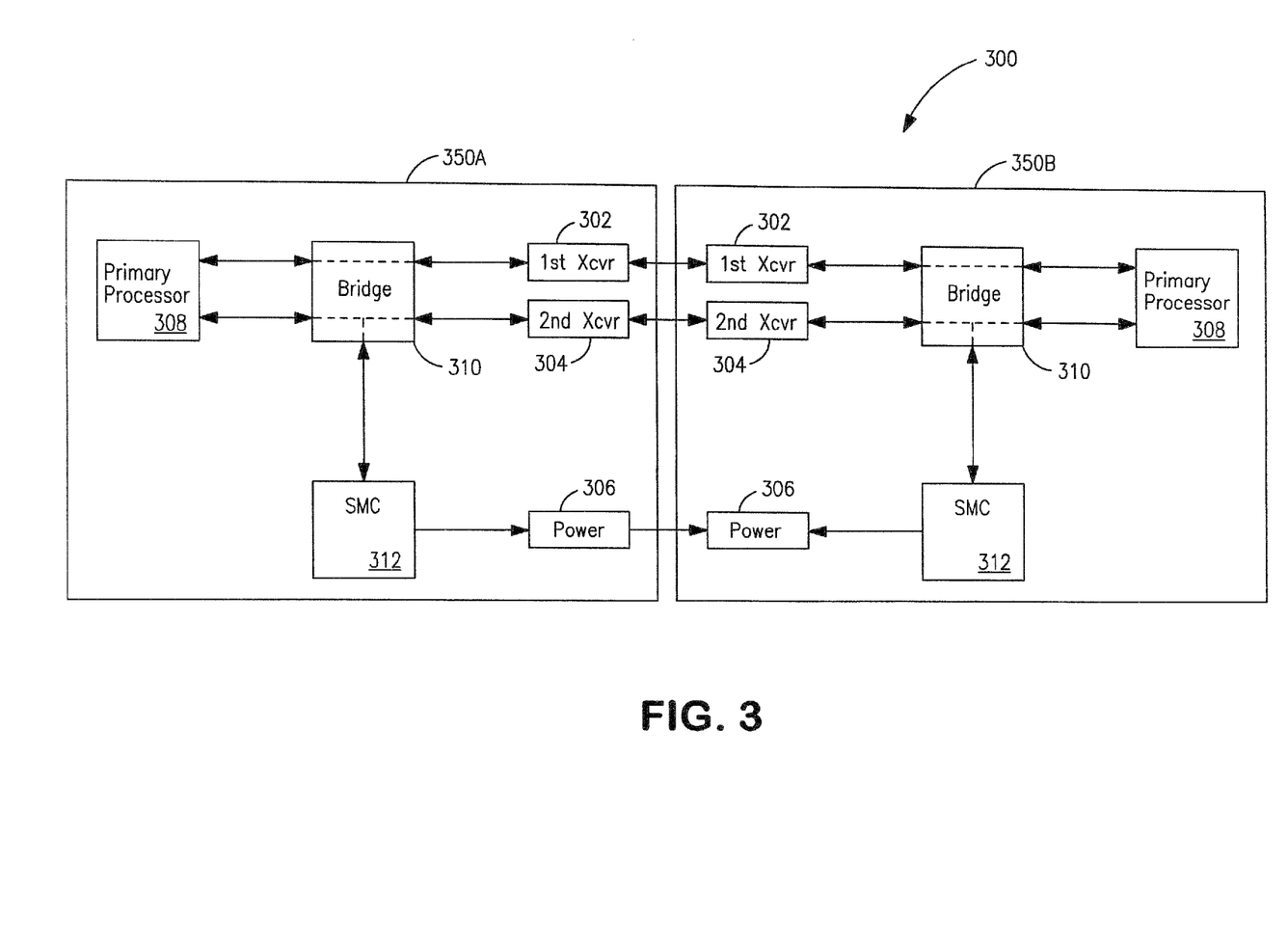
FIG. 3 is one exemplary system comprising two (2) devices capable of enhanced power operation, in accordance with the present invention.

FIG. 3 is a graphical representation of one exemplary system architecture 300 configured to intelligently deliver power, at multiple power levels, to several exemplary devices 350 that may have different power delivery requirements, via a standardized unified interface, in accordance with one or more aspects of the present invention.

Each of the exemplary devices 350 of FIG. 3 comprises: (i) a first transceiver 302, (ii) a second transceiver 304, and (iii) a power interface 306. In an embodiment, the first transceiver 302 is an optical interface. In a further embodiment, the second transceiver 304 is a USB 3.0 compliant electrical interface. It will be recognized that "USB 2.0 only" and "USB 3.0 only" variants (i.e., optical plus USB 2.0 only, or optical plus USB 3.0 only) are also contemplated by the invention. The power interface 306 is a VBUS connection capable of supporting the prior art USB power modes (i.e., low and high power modes for USB 2M and USB 3.0), and an "enhanced" power mode.

The enhanced power mode power delivery requirements are more than ten times greater than typical prior art USB power delivery levels. Additionally, the enhanced power mode supports a higher maximum voltage of 28V at a maximum power output of 85 W. This translates to an average current draw of approximately 3 A. As shown in FIG. 3, the first device 350A provides power to the second device 350B; however, as will be made apparent hereinafter, this illustrated direction is chosen arbitrarily and is intended to describe an exemplary embodiment of FIG. 3. In accordance with the principles of the present invention, other flexible power delivery implementations are outlined below.

As shown, a first and a second device (350A, 350B) are coupled via the standardized interface. While the actual mating of the devices is not shown, it is appreciated by those skilled in the related arts that any number of schemes may be used for the physical and electrical configuration of the standardized interface (e.g., a male connector that fits with a female connector, an interposed cable, etc.).

Each device 350A, 350B further comprises: (iv) a primary processor 308, (v) a bridge circuit 310, and (vi) a system management controller (SMC) 312.

The primary processor 308 generally comprises a digital signal processor, microprocessor, field-programmable gate array, etc. This processing system acts as the "master" processing component of the device 350, and is configured to execute software applications which typically interface with another device or user. For example, the primary processing system manages data transfers and control the unified interface. Thus, the processing system controls the physical operation, network connectivity, and protocols for data transfer; e.g., the primary processing system establishes a communications link with other devices across one or more "lanes" of the unified interface. As shown in FIG. 3, the primary processors of the first device and second device (350A, 350B) have established a data transfer channel via the first transceivers 302 (optical link).

The primary processor 308 is connected to the unified interface via a bridge circuit 310. The bridge circuit is a configurable fabric adapted to manage the external interfaces of the primary processor 308. For example, common implementations of a bridge circuit are logically divided between a Northbridge, and a Southbridge, wherein the Northbridge handles high-speed memory accesses (e.g., Dynamic Random Access Memory (DRAM)), and the Southbridge handles external peripheral or network accesses (e.g., Ethernet, USB, FireWire, etc.). As shown in FIG. 3, the bridge circuit is configured to connect: (i) the primary processor 308 to the first transceiver 302 and the second transceiver 304, (ii) the primary processor to the system management controller 312, and (iii) the system management controller to the second transceiver 304. The foregoing connections and topology are purely illustrative; as readily appreciated by a practitioner of the related arts, the bridge circuit may be dynamically configurable, and can support swapping, disabling/enabling, multiplexing, etc. of connectivity.

The System Management Controller (SMC) 312 is a secondary apparatus (e.g. processor) responsible for the device management features, and is typically autonomous from the primary processor 308. For example, certain implementations of the SMC can function without powering the primary processor. SMC capabilities may include, inter alia, (i) power management (e.g., power sequencing, reset, sleep, etc.), (ii) environmental management (e.g., thermal control, fan control, ambient light monitoring, backlight control, accelerometer, etc.), and (iii) miscellaneous I/O functionality (e.g., keyboard, mouse, etc.).

However, unlike prior art devices, the exemplary devices 350 have been further modified to support enhanced power mode delivery, using their respective SMCs 312, bridge circuits 310, and an allocated portion of the unified interfaces. More specifically, the exemplary devices 350 are configured to establish a communication channel between SMCs through the unified ports' power interface 306. The first SMC establishes a communications link with the second SMC across the USB power interface, while maintaining the existing power delivery functionality and requirements specified for legacy USB compliant hosts and devices. Power management generally requires very low information rates, and may be implemented with low-speed communication protocols between the secondary processors (e.g., I2C, RS-232, etc.) or other methods as desired. Extant power management protocols may also be used (and modified if needed) to implement the intelligent enhanced power mode of the invention as well.

Figure 4:
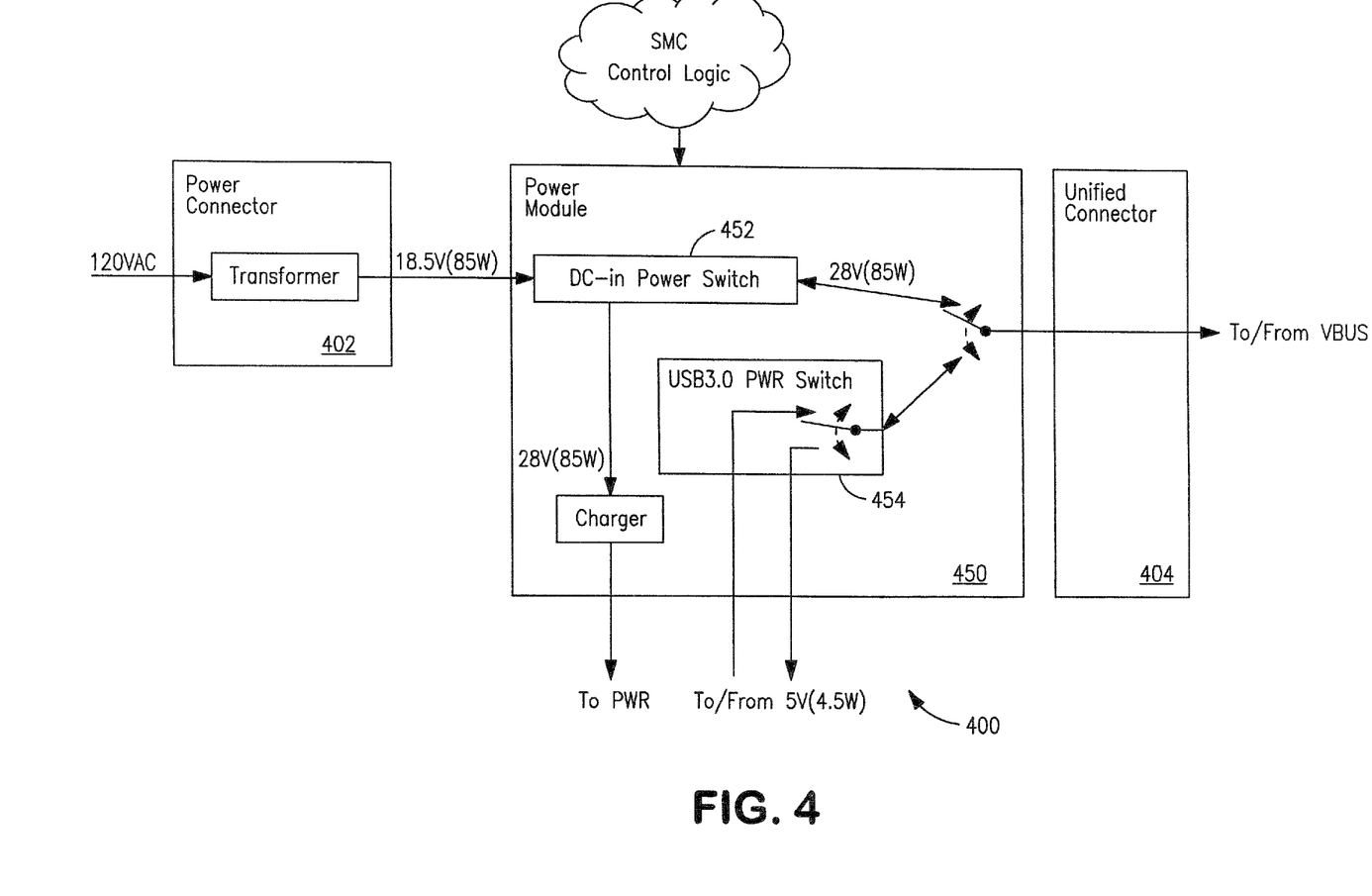
FIG. 4 is one exemplary embodiment of a power distribution architecture managed by a system management controller in accordance with the present invention.

Referring now to FIG. 4, the SMC manages power distribution for one embodiment of the present invention. As shown, the power architecture 400 comprises: (i) a standard power connector 402, (ii) a power module 450, and (iii) a unified connector 404. The SMC provides control logic for switching between various power delivery modes. The SMC control logic connection 408 depicts a general connection link between the SMC and the power module 450. Individual control connections inside the power module are not shown for clarity and are, typically, implementation specific.

The SMC power management logic is typically implemented within a computer readable media (e.g., HDD, Compact Flash or other external card, CD ROM, memory, etc.) adapted for storing software instructions, and may include instructions for conditional power delivery, intelligent power delivery, failover mechanisms, power loss execution, etc. Exemplary embodiments of power management logic are described in greater detail subsequently herein.

The standard power connector 402 includes necessary transformers to convert incoming voltage typically in a range between 100 VAC-240 VAC single phase (i.e., typical of power supplied within. North America or European Union) to voltage levels suitable for charging and operating the device 350 (e.g., 18.5V (85 W)). It is appreciated by these skilled in the arts that the power connector 402 can be further configured to accommodate other power conversion requirements that are based on specific requirements of other geographic regions or applications.

As shown, the unified connector 404 receives and delivers USB power via the VBUS (5V (4.5 W)). While power delivered via USB is typically insufficient to support the primary processor power draw, USB power is adequate to power the SMC controller. The lower power requirements of the SMC controller, compared to the primary processor, enable additional power management schemes and power control operation discussed in detail herein.

In an embodiment, the architecture 400 may further comprise a rechargeable battery (not shown), that is used to power up devices 350 when main power is unavailable. The unified connector is therefore configured to receive and deliver power suitable for charging the battery, and/or operate the primary processor. This primary processor comprises processor from either of the devices 350A, 350B. As shown in FIG. 4, the power of the enhanced power mode (85 W@28V) is delivered via the existing VBUS wires; however, the switch must be enabled by the SMC control logic, to ensure that true USB devices connected to VBUS receive only the appropriate USB compliant power.

The power module 450 intelligently directs and/or routes power signals from either the power connector 402 and/or the unified connector 404. The power module comprises a DC-in power switch 452 and a USB 3.0 VBUS switch 454. The VBUS switch selectively connects VBUS to the internal USB 3.0 modules (e.g., receiving external VBUS from a powered peripheral), or alternately, sources an external USB 3.0 device from the internal USB 3.0 power. In at least one embodiment, the external VBUS power supply powers the SMC control logic.

The DC-in power switch 452 typically receives 18V (85 W) DC-in power from the unified connector 404. In an embodiment, the switch 452 receives 28V (85 W) DC-in power. Received power is regulated via a charger circuit (e.g., a buck/boost transformer, etc.) and distributed internally. In an embodiment, the DC-in power switch can indirectly pass the 120-240 VAC main supply power to connected devices, via the unified connector (using internal power regulation circuitry). In still other powered device embodiments, internal device power can also be supplied to connected devices via the unified connector.

The following discussions provide several exemplary powering scenarios which employ the SMC managed power distribution of FIG. 4.

Example Operation, Charging—

Figure 5:
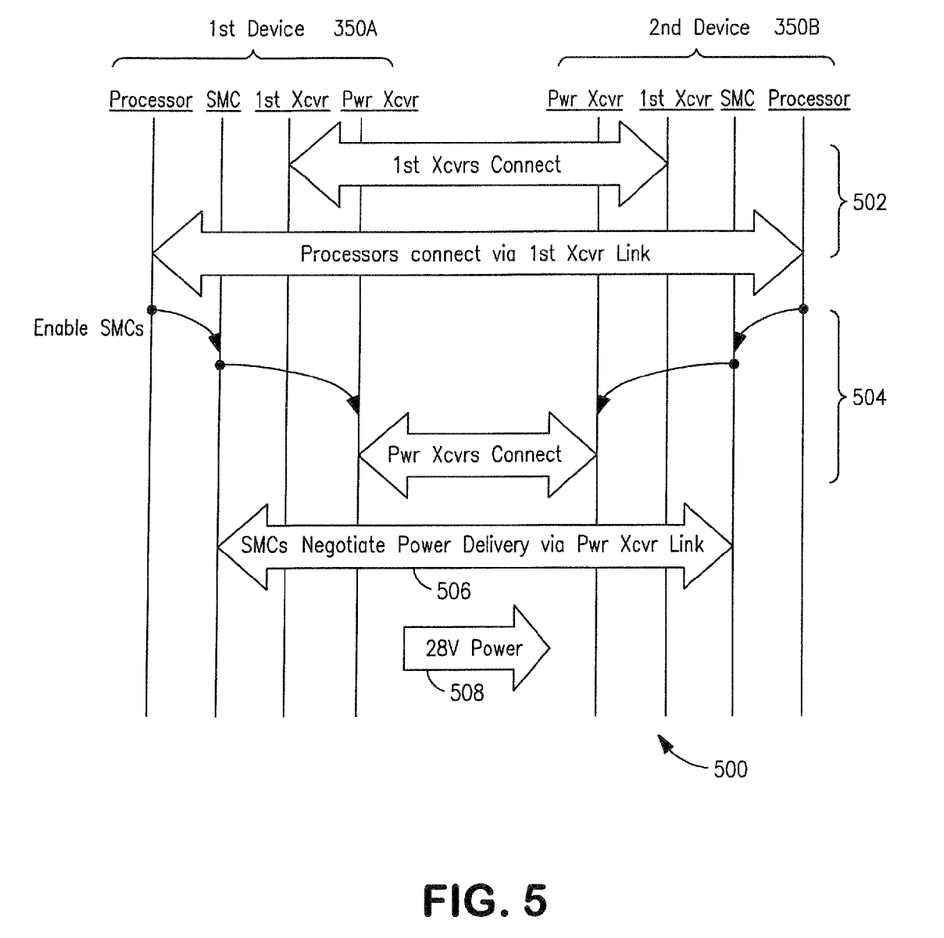
FIG. 5 is a graphical representation of the messaging processes for charging a second device from a first device, in accordance with the exemplary power distribution architecture of FIG. 4.

Referring now to FIG. 5, the logical diagram graphically represents the interface transactions between a first and a second device (350A, 350B) for requesting power delivery for charging, in accordance with various principles of the present invention.

As shown at step 502 of FIG. 5, the first and the second device (350A, 350B) are connected via the unified interface, utilizing the first transceivers (optical link 302). The processors actively execute software applications (networking, file transfer, etc.).

At step 504 of FIG. 5, the first and the second device initiate SMC communication over power link transceivers coupled to the VBUS (via power link transceivers 306 of FIG. 3) for SMC power management control.

Upon establishing a link between the first transceivers, the SMCs from both devices 350A, 350B enable both power transceivers via the existing power bus connections (e.g., VBUS). Additionally, the first and the second SMC determine if enhanced power delivery modes are supported, and subsequently configure their interfaces appropriately. In an embodiment, the SMCs request and acknowledge support for enhanced power delivery modes. In a further embodiment, the SMCs implement remedial bus arbitration (due to low traffic, very simple schemes may be used).

At step 506, the first and the second SMC negotiate power delivery via the power transceiver link. Based upon this negotiating, the first device 350A provides enhanced power output (28V (85 W)) to the second device 350B via the VBUS connections as shown at step 508.

Example Operation, Power-Up—

Figure 6:
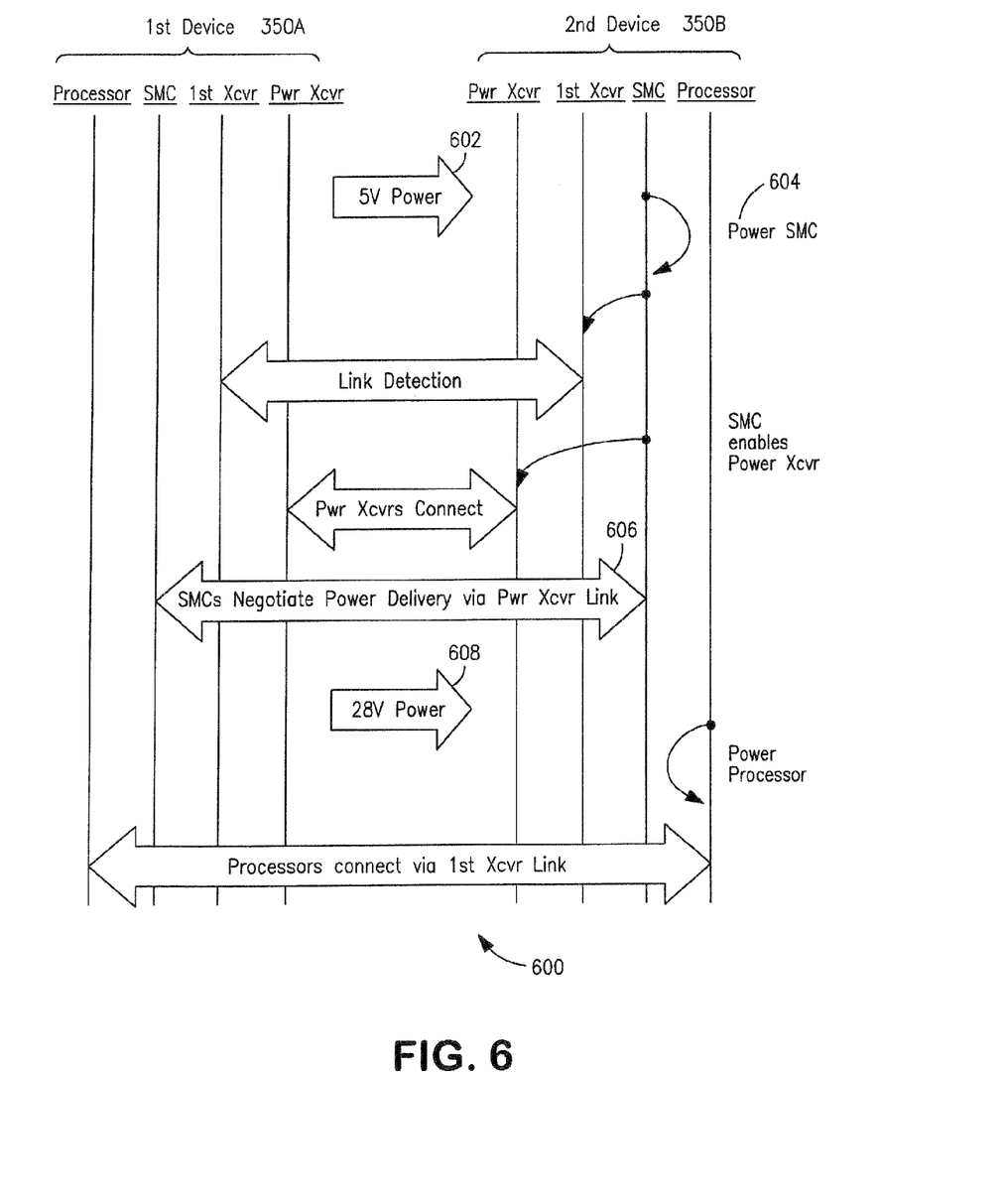
FIG. 6 is a graphical representation of the messaging processes for powering a second device (without power) from a first device, in accordance with the exemplary power distribution architecture of FIG. 4.

Referring now to FIG. 6, the logical diagram graphically represents the interface transactions between a first and a second device (350A, 350B), where the second device is initially unpowered, in accordance with the principles of the present invention. Unlike the prior example described with respect to FIG. 5, in the present embodiment the second processor (the processor of the device 350B) is not initially operating as it does not have sufficient power.

As shown in FIG. 6, the first and the second device (350A, 350B) are connected via the unified interface; however, the second device is unpowered, and neither first nor second transceivers are active. The first device detects device connection to its USB electrical connections. Initially, the first device assumes that the connected device is an unpowered USB device. The first device provides USB power to the second device, to engage in a prior art USB enumeration processes, as shown at step 602.

In one embodiment, link detection circuitry for the first transceiver of the second device is also powered (e.g., by the legacy USB power mode of the first device). Powering the link detection circuitry for the first transceiver of the second device advantageously does not need to be "gated" by the second device's SMC powering up before.

At step 604, the VBUS powers the second device's SMC (second SMC), bridge circuit and first interface (optical) for link detection, and power transceiver. The low power requirements for the second SMC, bridge circuit, optical interface link detection, and power transceiver can be driven from standard USB compliant VBUS. However, rather than behaving as a USB device, the second SMC uses VBUS to initialize link detection of the optical interface. Responsive thereto, the first device's processor changes to unified port operation, and the first SMC and second SMC establish a connection via their power transceivers. The second SMC indicates (via a limited software client) that it is co-resident with a second processor (second device's processor) that is un-powered. At step 606, the first and second SMCs negotiate enhanced power delivery modes over the power interface.

At step 608, the first device provides enhanced power output (28V (85 W)) to the second device via the VBUS connections, allowing the second device to power its primary processor and initiate a data channel over the first interface (optical).

As previously discussed, the foregoing examples are based primarily on the exemplary unified port interface (optical and USB). Consequently, a description of generalized methods and apparatus for implementing one or more aspects of the present invention is now presented.

Methods—

The following discussion provides generalized methods for intelligently providing power to a device. In one implementation of the invention, the method involves allocating and/or enhancing a secondary (electrical/power) interface of a unified multi-interface connection to implement logic configured to detect compatibility, and administer varying power delivery schemes, although the generalized method can be extended to other configurations as well (e.g., the primary interface performing the detection, and re-tasking the secondary interface to supply the enhanced power), as will be appreciated by those of ordinary skill given the present disclosure.

While the following methods are described primarily in the context of a simple topology wherein a first device is connected to a second device, it is appreciated that very complex topologies may benefit from various aspects of the present invention as well. For example, within a "tree" topology, an intelligent first device must consider power requirements for all the devices located on subsequent branches (e.g., even devices which are one or more layers removed). Similarly, in "daisy chain" topologies, a device can request power via each link in the chain. Furthermore, certain topologies may require partitioning; for example, a mixture of enabled and non-enabled connected devices may implement enhanced power capabilities within a subset of the group. Such partitioning may be particularly useful in embodiments where enhanced devices are intermixed with unknown or incapable devices.

Furthermore, while the following discussions are chiefly described with reference to a unified port interface having an optical transceiver and an electrical transceiver, the invention may be applicable to any interface combining multiple interface sub-types. Various aspects of the present invention may be adapted for "electrical only" embodiments by ones having ordinary skill in the related arts, given the contents of the present disclosure. For example, within USB 3.0 embodiments, the USB SS, and USB 2.0 pins are exclusively used; i.e., during USB SS operation, the USB 2.0 wires (D+, D−) are unused. Thus, the present invention could support the USB SS interface, while re-purposing the USB 2.0 wires for intelligent power management operation.

Figure 7:
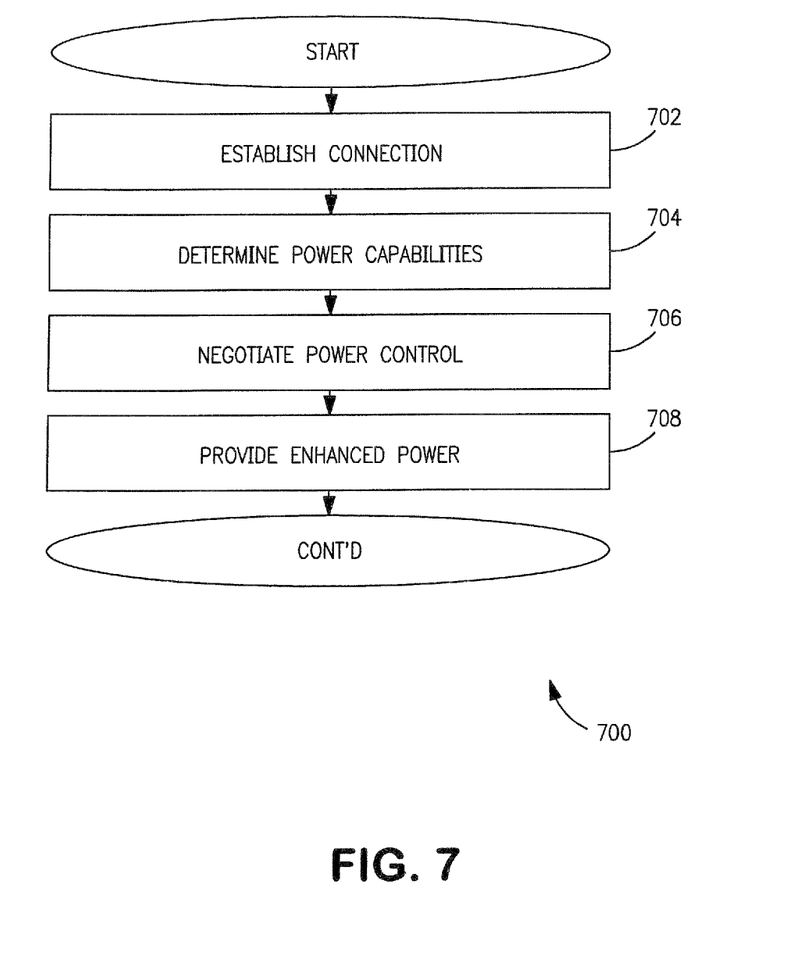
FIG. 7 is a logical flow diagram of one embodiment of the generalized process for intelligently providing power to device, in accordance with the present invention.

FIG. 7 illustrates one exemplary generalized method 700 for power distribution according to the invention. At step 702 of FIG. 7, a connection is established. In one embodiment, a primary connection is established and active (i.e., used in the transfer of data), and one or more secondary interfaces are inactive (i.e., unused). In alternative embodiments, a primary connection is established and active, and one or more secondary connections are also active. In various embodiments, the primary and secondary interfaces are optical and electrical, or electrical and electrical connections, respectively.

For example, in one exemplary embodiment, the connection is a unified optical and USB interface. This interface includes optical and electrical connections, and supports a wide variety of communication protocols. The unified interface can be interchangeably used with existing standards, including: Peripheral Component Interconnect (PCI) and its variants (PCI-X, Compact PCI, etc.), DisplayPort, High Definition Multimedia Interface (HDMI), USB, Ethernet, SATA, etc.

Additionally, a power interface is connected for power delivery. Power interfaces generally comprise at least a power and a ground terminal. For example, USB based embodiments provide a VBUS (5V) and a GND (0V). Moreover, the present invention also contemplates the use of an inductive electro-magnetic power/data coupling as part of the connection; e.g., one which is contactless.

In one embodiment of the method, a systems management controller (SMC) communicates via the power interface. In one variant, the SMC communicates with another SMC; alternatively, the SMC communicates with a processor. In one implementation, the SMC modulates power control commands over the power transceivers, using a simple protocol (which may be dedicated to that purpose, or "reused" from another function, or which can perform multiple functions at once). The commands are received by the receiver and interpreted. In one variant, the modulation is performed directly on the power rail. For example, the SMC may modulate messaging within the acceptable tolerance ranges of the power rail. The signaling is received by the peer SMC or other entity. The peer device can still utilize the power rail, as the signaling does not exceed tolerances In another exemplary implementation, repeated current pulse signaling ("tones") are superimposed onto the DC power bus to establish a low speed (e.g. 4 Kbps) communication channel between the two endpoints (or one endpoint and a device interposed between it and the other endpoint). Both capable endpoints are required to have a series inductance in their port's power path for signal detection and the signal processing operations of the power transceivers. These transceivers have a direct connection to the SMC's I/O ports. If either end of the power bus does not support power bus signaling in this manner (e.g. legacy USB devices), a communication channel will not be established, and the power bus (VBUS) will remain in "base" mode (i.e., non-enhanced), such as per the USB standard.

In other alternate implementations, the SMC establishes a logical connection via an inactive secondary interface. The SMC may be allocated or given use of the active secondary interface, such as by the primary processor. Alternatively, the SMC itself may actively "commandeer" the secondary interface by requesting access, or pre-empting existing active traffic, or even time-sharing access according to a given scheme. For example, the SMC may issue an interrupt to the primary processor; in response, the processor services the interrupt, and exits the secondary interface. The SMC can thereafter assume control of the secondary interface.

One configuration of the foregoing alternate implementation relates to a unified interface having first and second data interfaces (e.g., on optical, and another electrical such as USB). One of the interfaces supplies power according to two (or more) different modes; e.g., a "baseline" mode (e.g., normal USB power as previously described herein), and a second (and possibly third, etc.) mode which provides "enhanced" power delivery, such as at a higher current, different voltage, filtered, conditioned, etc. The enhanced mode(s) is/are selected using signaling across the non-power interface (e.g., power mode change signals are sent along or interspersed with data on the primary interface), across the data portion of the power-enabled interface (e.g., across data pairs of USB interface), or even across the power pins of the power-enabled interface themselves. Combinations of the foregoing may also be used (e.g., where during one phase of power mode negotiation, a first interface or signal path is used, and during another phase, a different interface or signal path is used).

Proprietary or extant signaling protocols may be used for the foregoing purposes; similarly, such protocols may be dedicated solely for the power mode negotiation purpose, or provide other functions as well (e.g., be multi-functioned). For instance, communications can be established using the native protocol of the interface (e.g., USB), or a specialized protocol (e.g., I2C, RS-232, etc.) to reduce computational complexity, or protocol requirements, etc.

In still other embodiments, the SMC accesses may be multiplexed with existing active connections. For example, bridge circuits can route traffic from multiple sources to multiple destinations, using various multiplexing schemes. One such multiplexing scheme may be time-multiplexed, based on a round robin scheme, a weighting scheme, etc. Thus, a priority processor may have significantly more time allocated to an interface, than the SMC. Substitution for any variations of bus arbitration is well understood to those having ordinary skill in the related arts, given the contents of the present disclosure, and not described further.

In certain "lights-out" embodiments, no connections are active until the device is powered. In one such case, the device is powered with a first power level, wherein the first power level is sufficient to power one or more interfaces (but may for instance be insufficient to power the entire device).

At the conclusion of step 702, a connection has been established between one or more devices, wherein the connection is suitable for determining power capabilities.

A determination of power capability is made at step 704. In one embodiment, enhanced power capabilities are identified with compatible communication with a systems management controller (SMC). For example, peer SMC controllers can communicate with an established protocol to identify appropriate power capabilities. In one variant, the communication is performed via a connection between power transceivers. Alternatively, the communication is performed via a primary or secondary connection, where the primary or secondary connection is used for control or data transfer for a user or device driven software application.

In one embodiment, an explicit request for enhanced power capability information is made by the "power consuming" side. In alternate embodiments, capabilities for enhanced power availability are indicated in unsolicited messaging (for example, automatically included with an initial setup message, broadcast, etc.).

In still other embodiments, enhanced power capabilities can be inferred indirectly. For example, a model number or device type is provided during initial device connection. Based on received information, the interfaced devices determine if enhanced power is available.

Power capabilities may include elements such as: (i) number of power delivery modes possible, (ii) types of power delivery modes, (iii) current power available, (iv) maximum power source, (v) minimum power source, (vi) average power delivery, and/or (vii) burst delivery, etc. Similarly, corresponding consumption parameters may also be exchanged, for example: (i) number of operational modes possible, (ii) types of power modes, (iii) current power required, (iv) maximum power consumed, (v) minimum power consumed, (vi) average power consumed, and/or (vii) burst consumption, etc.

In some implementations, multiple power delivery options are possible. In one such case, at least one power delivery option is suitable for powering the entire device. In one exemplary variant, the device requires power delivery nominally rated to 28V (85 W). In other cases, the power delivery options include at least one standardized power delivery option (e.g., USB VBUS 5V), and at least one non-standard, implementation specific power delivery option (e.g., 28V (85 W)). In yet other variants, multiple enhanced power modes are provided based on the previously described power capabilities. For example, a first device may have multiple enhanced power delivery options. Based on a determination of the types of power modes supported by a peer device, the first device can intelligently select an appropriate enhanced power delivery mode.

The power delivery options may vary e.g., depending on the peer device. For example, a first device may identify a second device, and based on the second device type, only provide a limited subset of power delivery options.

In still other implementations, the power delivery options may be adjusted based on topological or internal device considerations. For example, a device connected to a network of other devices may request power from a number of other devices, or similarly, may provide power to a number of other devices. Thus, a network of devices may intelligently load balance such that no single device has to bear the brunt of power delivery. In another example, a device which is already heavily loaded with internal power requirements may opt not to provide power to other devices, despite its capacity to do so.

During step 706, the one or more devices negotiate power control. In one exemplary embodiment, negotiation is based on pre-defined roles; for example, devices may be classified as charging, chargeable, or both charging and chargeable. Thus, if a charging device is connected with a chargeable device, power delivery occurs. In another embodiment, power delivery is based on the availability and/or sufficiency of power from other sources. For example, a device which is receiving power from a power source does not require power from a second device (e.g., a laptop which is plugged into an AC adapter as well as a powered peripheral preferentially receives power from the AC adapter, etc.).

In more complex embodiments, power delivery may require active negotiation. For example, devices which are capable of charging and also chargeable, may negotiate power delivery based on their current power consumption. Such negotiation may be aimed at balancing, or unbalancing, power consumption. In one such case, two (2) peer devices may aim to power both devices if possible e.g., the devices can alternate between charging and chargeable. Alternatively, a "chargeable" device may always drain power from a "charging" device when attached. In yet another example, the device with the heavier application load is always the "charging" device. Negotiation may be especially necessary within networks of connected devices which have multiple possibilities for power distribution. Yet other schemes and scenarios are readily apparent to and implemented by ones having ordinary skill in the related arts, given the contents of the present disclosure.

At step 708 of the method 700, the appropriate enhanced power is provided. In some embodiments, one or more devices continue communication. For example, a device that is plugged into a first power source and a second charging device, can be unplugged from the power source, and continue to operate from the second charging device. In yet another embodiment, a first device that is providing power to a second device may be running low on power; thereafter, the first device transmits a notification to the second device that power is going to be cut off (e.g., over the data or even the power interface). The early warning enables the second device to appropriately shut down, enter low power operation, and/or evaluate other possible indigenous or available sources of power.

Exemplary Apparatus—

Figure 8:
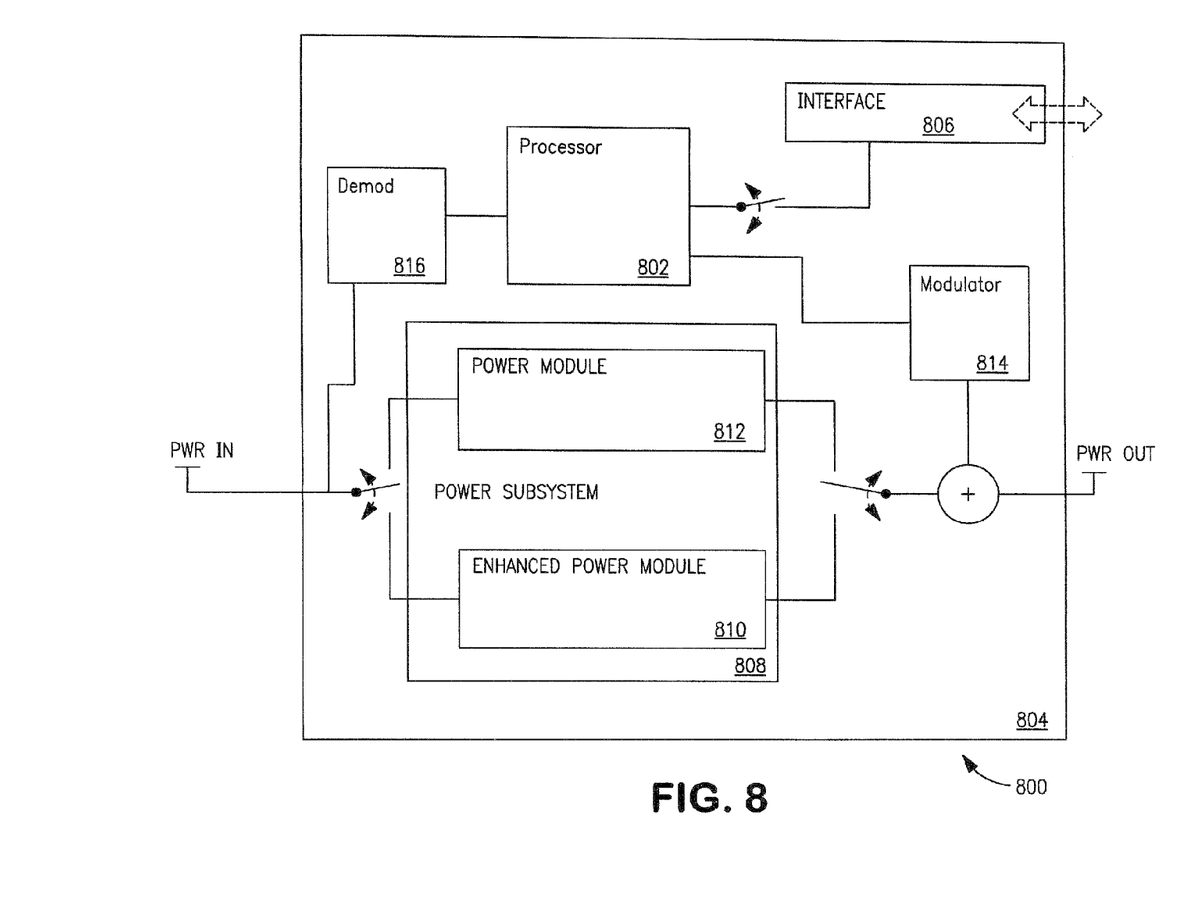
FIG. 8 is a block diagram of one embodiment of an "enhanced" power enabled apparatus configured in accordance with the present invention.

Referring now to FIG. 8, exemplary apparatus 800 for implementing the methods of the present invention is illustrated.

The apparatus 800 includes a processor subsystem 802 such as a digital signal processor, microprocessor, field-programmable gate array, or plurality of processing components mounted on one or more substrates 804. The processing subsystem 802 is connected to a memory subsystem comprising memory. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. In one exemplary embodiment of the present invention, the processing subsystem comprises a systems management controller (SMC) which is capable of communicating with another controller or processor via an interface 806, and managing the power subsystem 808.

In the illustrated implementation, the apparatus 800 further comprises a switchable connection between the processor 802 and interface 806. This switchable link controls connect and disconnect between the processor and the interface. As previously described, the switchable connection to the interface can be implemented in a reconfigurable bridging fabric. Alternatively, the switchable connection is implemented as a dedicated hardware switch. Still other configurations are readily recognized by ones having ordinary skill, given the contents of the present disclosure.

In the exemplary embodiment, the interface generally includes transceiver logic useful for driving one or more transmission media (e.g., fiber optic, copper wire, electromagnetic spectrum, etc.). As previously described, the present invention is in one variant a unified interface having one or more optical transceiver(s) and/or electrical transceiver(s) (e.g. USB, etc.). This interface comprises at least a USB Super Speed compliant connector, having the electrical contacts for (SS RX+, SS RX−, SS TX+, and SS TX−), an optical interface, and a power interface.

The power subsystem 808 of FIG. 8 receives and delivers power external to the apparatus 800. As shown, the power subsystem is further divided into an "enhanced" power module 810 and a "standard" power module 812. It is appreciated that while the exemplary embodiments described herein associate the term "enhanced" with increased levels or magnitude, the present invention is in no way so limited, and hence "enhanced" power may take on other forms, including without limitation: (i) power delivered over a different interface or medium (e.g., wired versus inductive/contactless); (ii) power of a different frequency and/or phase; and/or (iii) power that has been specially conditioned (e.g., filtered, rectified, shaped, etc.).

In one embodiment of the present invention, the apparatus of FIG. 8 additionally comprises a power interface comprising a modulating 814 and demodulating 816 portion. The power interface is adapted to modulate and demodulate control signals from the power rail. As shown, the modulating output is coupled to the output power rail, and a demodulating input is coupled to the input power rail. In some embodiments, the input and output power rail may be the same physical connection (e.g., VBUS). Similarly, the modulating and demodulating apparatus may be combined within a single entity. Various other implementations may include additional circuitry to isolate signaling from power delivery.

Furthermore, while both charging and chargeable elements are shown, various implementations of the power subsystem may be receive-only, or delivery-only. It is also recognized that charging and chargeable elements may not be symmetric; for example, the enhanced power module 810 may be able to receive power, but not deliver. In another example, there may be no charging portion for the power module 812, instead relying solely on an enhanced power module to drive the power module.

Furthermore, while the illustrated embodiment has two (2) power subsystems (power module 812, and enhanced power module 810) it is appreciated that greater or fewer subsystems may be possible. For example, a single power module may be configured to offer both standard and enhanced power versions. Similarly, multiple power modules may be selectively connected. For example, within some implementations, multiple power modules are provided for varying other modes (e.g., 5V, 3.3V, 1.8V, etc.), any of which may be switched to output power.

The apparatus of FIG. 8 generally further includes additional devices including, without limitation, additional processors, one or more GPS transceivers, or network interfaces such as IrDA ports, Bluetooth transceivers, Wi-Fi (IEEE Std. 802.11) transceivers, WiMAX (IEEE Std. 802.16e) transceivers, USB (e.g., USB 2.0, USB 3.0, Wireless USB, etc.), FireWire, etc. It is however recognized that these components are not necessarily required for operation of the apparatus 800 in accordance with the principles of the present invention.

It is further recognized that the apparatus of FIG. 8 may take on any number of different form factors. For instance, the apparatus 800 may be a desktop or tower computer. It may also be a laptop or handheld computer, personal media device, PDA, mobile smartphone, server blade, plug-in card to a larger host device, display device or monitor, RAID array or storage device, network hub, and so forth. Accordingly, the present invention contemplates any number of different use cases, including without limitation: (i) a larger host device being the charging device, and a smaller mobile or portable device being the chargeable device; (ii) the larger host being the chargeable device and receiving power from the mobile device; (iii) two comparable peer devices, one charging the other; (iv) the aforementioned "tree" or "daisy chained" aggregation of multiple devices of similar or different types; and (iv) connection of a relatively simple or "dumb" (chargeable) peripheral with minimal intelligence to a larger, more intelligent (charging) host. Literally an unlimited number of use cases are possible according to the invention.

Figure 9:
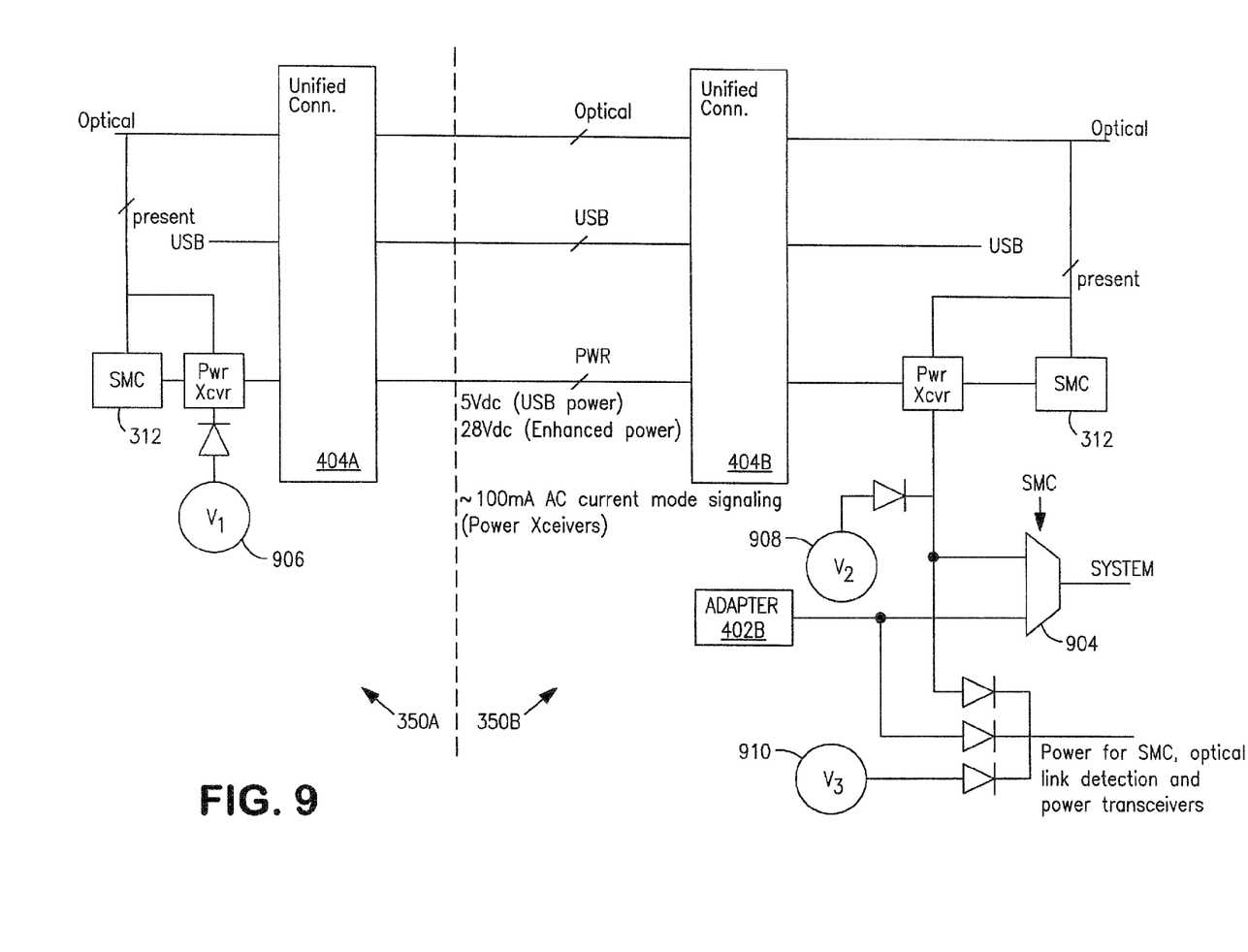
FIG. 9 is a block diagram of one exemplary system using the enhanced power delivery functionality of the invention.

FIG. 9 provides greater detail regarding one exemplary implementation of the unified interface 900 of the present invention. As depicted, a first device's unified connector (350A, 404A) is shown, connected with a second device's unified connector (350B, 404B).

The optical bi-directional interface of FIG. 9 includes a "present" indication, which is indicates the presence of a connected optical link. The present indication enables power transceivers connected to the power bus 902. If SMC controllers are not detected at both ends of the power bus after the power transceivers are enabled, both devices safely assume USB operation, and the power transceivers at one or both ends may be disabled until the connection status of the first (optical) transceiver changes.

Focusing attention to the details of the second device (350B), a power mux 904 controlled by the SMC selects between receiving power from the adapter 402B, or from the unified interface 404B. The power mux can provide power to the processing system. Thus, as shown, the primary processor can be powered either from the wall adapter, or from the unified connector's power interface.

The SMC powering scheme also allows for low power operation. As shown in FIG. 9, the SMC is configured to receive power from V1 906 (e.g., external 5V, or 28V), V2 908 (e.g., internal 5V), V3 910 (e.g., internal battery), or the wall adapter 402B (e.g., external 18V). Accordingly, the SMC can be powered by: (i) internal or external USB power (VBUS 5V), (ii) internal or external processing power (VMAIN 28V), and (iii) the wall adaptor (18V).

Business Methods and Rules—

It will be recognized that the foregoing apparatus and methodologies may enable, and be readily adapted to, various business models and methods.

In one such paradigm, appropriately enabled devices have many more versatile methods for delivering power, and thereby reduce user frustrations. Advantageously, various implementations of the present invention can remain fully backward compatible with legacy devices, and similarly devices implementing the invention can operate in conjunction with low-power devices without causing damage from over-voltage or over-current operation. The forgoing approaches are markedly more efficient, and may also significantly improve the availability of powering a device, thereby extending the usable range of the device (e.g., the device is no longer "tethered" to an outlet, or a specialized charger, etc.). In fact, the present invention contemplates that devices without any AC wall adapter or other input power source may be introduced, relying solely on the unified optical and USB interface or similar interface described herein for electrical power. Such devices can be offered by the manufacturer as "upgraded" or "premium" devices for this reason, and may even command higher prices.

Moreover, a given manufacturer may restrict access to use of the present invention to their own devices (i.e., only devices manufactured by Company X have the proprietary "enhanced" power interface), thereby inducing customers to buy Company X products so that they can obtain this desirable functionality. In one variant, the form factor of the interface connector is completely compatible with the relevant interface standard (e.g., optical and USB), yet has the additional "intelligence" described herein built into the supporting logic. Hence, under this model, while a user of a Company Y peripheral having a standard or non-enhanced unified optical and USB interface could physically plug into the Company X device and implement all standard unified functionality, no power could be drawn or delivered via that connector. In contrast, a Company X invention-enabled peripheral, when plugged into the Company X host, would be able to transfer "enhanced" power. Alternatively, the interface of the invention may be the basis for a standardized or open source implementation.

It is also envisioned that software or other mechanisms may be used within a host device (e.g., charging device) for monitoring/logging and even analyzing power consumption of one or more charged devices. This approach may also lend itself to electrical power metering capability, such as where consuming (charged) devices pay a fee (or provide other consideration) for the availability of electrical power.

Myriad other schemes for implementing, and business method for exploiting existing interfaces for enhanced power delivery will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized apparatus, comprising:
   a dual interface, comprising:
      a first interface configured for data transfer; and
      a second interface configurable for delivering power at a plurality of power output levels from an output power rail, and configurable for receiving power from an input power rail;
   a processor coupled to the dual interface;
   a demodulator coupled to the input power rail to demodulate an input power control command from the input power;
   a modulator coupled to the output power rail to modulate an output power control command into the output power; and
   a storage apparatus in data communication with the processor, the storage apparatus comprising computer-readable instructions which, when executed by the processor and responsive to coupling an external device to the dual interface:
      determine a power level for the external device; and
      enable power output at the power level via the dual interface based on a classification for the external device and the computerized apparatus as one of the group consisting of a chargeable device, a charging device, and a both chargeable and charging device, wherein the chargeable device is configured to drain power from the charging device.

2. The apparatus of claim 1, wherein the second interface is further adapted for data transfer.

3. The apparatus of claim 1, wherein the first interface comprises a USB-compliant interface.

4. The apparatus of claim 3, wherein the dual interface further comprises an optical interface.

5. The apparatus of claim 1, wherein the first interface comprises an optical interface.

6. The apparatus of claim 2, wherein the second interface comprises USB-compliant interface having a USB-compliant power output level.

7. The apparatus of claim 6, wherein at least one of the plurality of power output levels comprises a level that is higher than the USB-compliant power output level.

8. The apparatus of claim 1, wherein the computerized apparatus comprises a portable computer.

9. The apparatus of claim 8, wherein the external device comprises a computer peripheral apparatus.

10. The apparatus of claim 9, wherein at least one of the plurality of power output modes comprises a mode adapted for charging the external device.

11. A method of providing power in a computerized apparatus configured for data transfer over an interface, the method comprising:

establishing at least one link between a first device and a second device, the at least one link configurable for power and data transfer via the interface;

responsive to establishment of the at least one link, determining:
   a power delivery capability of the first device; and
   a required power level for the second device;

negotiating a power control scheme between the first device and the second device via the interface;

based at least in part on the act of negotiating, providing power to the second device via the interface, wherein negotiating a power control scheme comprises classifying the first device and the second device as one from the group consisting of a charging device, a chargeable device, and a both charging and chargeable device, and further wherein
   providing power to the second device comprises draining power from the charging device to the chargeable device;

modulating in an output power rail in the first device a power control command into the output power provided by the first device; and demodulating in an input power rail in the second device the power control command from the input power received by the second device.

12. The method of claim 11, wherein the act of determining a power level required by the second device comprises receiving a message from the second device; and wherein the step of negotiating a power control scheme is configured to comply with both the power delivery capability of the first device and the power level required by the second device.

13. The method of claim 11, wherein the interface comprises a USB-compliant interface configured for power transfer at a plurality of power levels, at least one of the plurality of power levels comprising a USB-compliant power level.

14. The method of claim 13, wherein the providing power to the second device comprises configuring the USB-compliant interface for providing power at a level that is in excess of the USB-compliant power level.

15. The method of claim 12, wherein the message comprises a request to provide power at an enhanced level.

16. The method of claim 13, wherein the computerized apparatus further comprises a second interface, and the method further comprises configuring the second interface for transfer of data in lieu of the first interface.

17. The method of claim 11, wherein the first interface comprises a USB interface, and the act of providing power to the second device comprises providing power at a USB-compliant power level.

18. The method of claim 11, wherein the negotiating a power control scheme is performed substantially independent from the data transfer.

19. A multipurpose interface for use with computerized devices, comprising:
   a first interface configured for data transfer;
   a second interface configured for power transfer, the second interface comprising an input power rail configured to receive a plurality of input power levels and an output power rail configured to provide an output power;
   a demodulator coupled to the input power rail to demodulate an input power control command from the input power;
   a modulator coupled to the output power rail to modulate an output power control command into the output power; and
   a logic apparatus coupled to the first interface and the second interface, and comprising a medium adapted to store computer-readable instructions, the instructions which, when executed:
     determine if a device is coupled to at least one of the first interface and the second interface;
     if the device is coupled, determine a required power for the device;
     negotiate with the device a power delivery scheme based at least in part on the act of determining the required power; and
     provide the required power to the device via the second interface in accordance with the scheme, wherein
       to negotiate a power deliver scheme comprises to classify the device as one from the group consisting of a charging device, a chargeable device, and a both charging and chargeable device, and further wherein
       to provide the required power comprises to drain power from the charging device to the chargeable device.

20. The multipurpose interface of claim 19, wherein the act of determining a required power comprises receiving a message from the device.

21. The multipurpose interface of claim 19, wherein the act of determining a required power comprises (i) prompting the device, and (ii) substantially in response to the prompting, receiving at least one message from the device.

22. The multipurpose interface of claim 19, wherein the first interface comprises a USB-compliant interface.

23. The multipurpose interface of claim 22, further comprising an optical interface.

24. The multipurpose interface of claim 19, wherein the second interface comprises a USB-compliant interface configured for both power transfer and data transfer.

25. The multipurpose interface of claim 24, wherein the USB-compliant interface is configured to support a plurality of power transfer modes, the plurality of power transfer modes comprising at least a USB-compliant power transfer mode and a second power transfer mode, the second power transfer mode configured to transfer power substantially in excess of the USB-compliant power transfer mode.

26. The multipurpose interface of claim 25, wherein the first interface comprises an optical interface adapted to perform the data transfer of the second interface.

27. The multipurpose interface of claim 25, wherein the plurality of power transfer modes further comprises a mode adapted for charging a second device.

28. A storage apparatus for use with a computerized device, comprising:
   a storage medium having a computer program stored thereon, the program configured to, when executed by the computerized device:
     classify an attached device and the computerized device according to one from the group consisting of a charging device, a chargeable device, and a both charging and chargeable device, the attached device being attached via an interface of the computerized device;
     determine a required power level for the attached device; and
     enable power output from the charging device to the chargeable device at the required power level via the interface;
   an output power rail configurable to deliver power at a plurality of power output levels when the storage apparatus is classified as a charging device, the delivered power comprising a delivered power control command; and an input power rail configurable to receive power when the storage apparatus is classified as a chargeable device, the received power comprising a received power control command.

29. The storage apparatus of claim 28, wherein the execution of the program is substantially in response to coupling the attached device to the interface.

30. The storage apparatus of claim 28, wherein the interface is configurable for delivering power at a plurality of power levels, the plurality of power levels comprising: (i) a low power level that is substantially compliant with a high-speed serialized bus protocol yet incapable of supplying the required power level; and (ii) a high power level capable of supplying the required power level.

31. A client peripheral apparatus configured to interface with a host computerized device, the client peripheral apparatus having no indigenous power source, the client peripheral apparatus comprising:

a first logic configured to negotiate with the host device to obtain first electrical power via an interface, the first electrical power sufficient to power the client peripheral apparatus during a normal mode of operation; and a second logic configured to enable obtaining second electrical power sufficient to power the first logic, but insufficient to power the client peripheral apparatus in the normal mode, wherein the client peripheral apparatus is configured to receive a power control command to select an enhanced power mode from the group consisting of: a power delivered over a different medium, a power of a different frequency, a power of a different phase, and a power that has been conditioned.

32. The client peripheral apparatus of claim 31, wherein the first logic negotiates with the host using a data signal path of the interface.

33. The client peripheral apparatus of claim 32, wherein the negotiation with the host using a data signal path of the interface comprises negotiation according to a simplified message exchange protocol.

34. The client peripheral apparatus of claim 33, wherein the simplified message exchange protocol is resident on the client apparatus and is also used for a function other than the power negotiation.

35. The client peripheral apparatus of claim 31 wherein a power that has been conditioned comprises one of the group consisting of: a power that has been filtered, a power that has been rectified, and a power that has been shaped.

36. A device interface enabling a single cable to be used for transmitting electrical power and data between first and second computerized devices, the interface comprising:

a data path;

a power path sufficiently proximate to the data path within the interface so that the single cable can complete both the data path and the power path between the first and second computerized devices; and a power transceiver for negotiating power delivery from one of the first and second computerized devices to the other, wherein:

negotiation of power delivery over the cable is performed substantially independent from software application traffic sent over the data path, and is performed classifying the first and the second computerized device as one from the group consisting of a charging device, a chargeable device, and a both charging and chargeable device, the power transceiver is configured to drain power from the charging device to the chargeable device, and the power path comprises:

an input power rail coupled to a demodulator configured to demodulate a power control command in the first computerized device, and an output power rail coupled to a modulator configured to modulate the power control command in the second computerized device.

37. The interface of claim 36, wherein the electrical power is sufficient to provide at least one of (i) charging of a battery of the one of the first and second computerized devices receiving the electrical power, and/or (ii) powering substantially all functions of the one of the first and second devices receiving the electrical power in a normal operating mode for at least a period of time.

38. The interface of claim 36, wherein the negotiation of power delivery over the cable is performed over the power path.

39. The interface of claim 36, wherein the negotiation of power delivery over the cable is performed over the data path, and the negotiation comprises use of a low bandwidth protocol.

* * * * *